United States Patent
Herthan et al.

(10) Patent No.: US 10,613,519 B2
(45) Date of Patent: Apr. 7, 2020

(54) METHOD FOR CONTROLLING A SLIDING DOOR ARRANGEMENT OF A MOTOR VEHICLE

(71) Applicant: BROSE FAHRZEUGTEILE GMBH & CO. KOMMANDITGESELLSCHAFT, BAMBERG, Bamberg (DE)

(72) Inventors: Bernd Herthan, Michelau (DE); Frank Ebert, Memmelsdorf (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 15/532,907

(22) PCT Filed: Dec. 1, 2015

(86) PCT No.: PCT/EP2015/078191
§ 371 (c)(1),
(2) Date: Jun. 2, 2017

(87) PCT Pub. No.: WO2016/087435
PCT Pub. Date: Jun. 9, 2016

(65) Prior Publication Data
US 2017/0357246 A1 Dec. 14, 2017

(30) Foreign Application Priority Data
Dec. 4, 2014 (DE) .................. 10 2014 117 896

(51) Int. Cl.
*G05B 19/416* (2006.01)
*B60R 25/20* (2013.01)
(Continued)

(52) U.S. Cl.
CPC ........ *G05B 19/416* (2013.01); *B60R 25/2054* (2013.01); *E05F 15/40* (2015.01);
(Continued)

(58) Field of Classification Search
CPC ........ G05B 15/416; E05F 15/40; E05F 15/70; E05F 15/73
(Continued)

(56) References Cited

U.S. PATENT DOCUMENTS 5,730,165 A * 3/1998 Philipp .................. E03C 1/057
137/1
9,081,032 B2 * 7/2015 Lange ................. B60R 25/2045
(Continued)

FOREIGN PATENT DOCUMENTS

DE 202006003901 7/2007
DE 102010018164 8/2011
(Continued)

OTHER PUBLICATIONS machine translation JP2007308008.*
(Continued)

*Primary Examiner* — Kawing Chan
(74) *Attorney, Agent, or Firm* — Pauly, DeVries Smith & Deffner LLC

(57) ABSTRACT

The disclosure concerns a method for controlling a sliding door arrangement of a motor vehicle, wherein the sliding door arrangement comprises a sliding door, a drive arrangement for motorized displacement of the sliding door, a control arrangement and a sensor arrangement with at least one sensor element, in particular implemented as a proximity sensor, where-in during operator event monitoring by means of the control arrangement the sensor signals of the sensor arrangement are monitored as to whether a predetermined operator event exists. It is proposed that the sensor
(Continued)

arrangement is disposed at least partly in or on the sliding door and that opening the sliding door at least from a closed end position and/or closing the sliding door at least from an open end position is/are carried out by means of the drive arrangement depending on the result of the operator event monitoring.

22 Claims, 3 Drawing Sheets

(51) Int. Cl.
  *E05F 15/655*   (2015.01)
  *E05F 15/73*   (2015.01)
  *E05F 15/40*   (2015.01)
  *E05F 15/70*   (2015.01)
(52) U.S. Cl.
  CPC ............ *E05F 15/655* (2015.01); *E05F 15/70* (2015.01); *E05F 15/73* (2015.01); *E05Y 2400/852* (2013.01); *E05Y 2400/86* (2013.01); *E05Y 2800/113* (2013.01); *E05Y 2800/116* (2013.01); *E05Y 2900/50* (2013.01); *E05Y 2900/531* (2013.01); *E05Y 2900/532* (2013.01)
(58) Field of Classification Search
  USPC ......................................................... 318/466
  See application file for complete search history.

(56) References Cited

U.S. PATENT DOCUMENTS

| | | | | |
|---|---|---|---|---|
| 9,463,776 | B2* | 10/2016 | Gunreben | B60R 25/2054 |
| 9,464,921 | B2* | 10/2016 | Van Gastel | H03K 17/955 |
| 9,637,087 | B2* | 5/2017 | Ma | G01S 13/931 |
| 2011/0126470 | A1* | 6/2011 | Higgins | B60R 16/0215 |
| | | | | 49/404 |
| 2012/0319502 | A1* | 12/2012 | Van Gastel | B60R 25/00 |
| | | | | 307/116 |
| 2013/0067816 | A1* | 3/2013 | Chang | H03K 17/955 |
| | | | | 49/25 |
| 2013/0099715 | A1* | 4/2013 | Fuhge | E05F 15/611 |
| | | | | 318/484 |
| 2014/0373447 | A1 | 12/2014 | Gunreben et al. | |
| 2015/0019085 | A1* | 1/2015 | Ma | G01S 13/931 |
| | | | | 701/49 |
| 2015/0134208 | A1* | 5/2015 | Gunreben | B60R 25/2054 |
| | | | | 701/49 |
| 2015/0345205 | A1* | 12/2015 | Gunreben | E05F 15/77 |
| | | | | 701/2 |

FOREIGN PATENT DOCUMENTS

| | | | | |
|---|---|---|---|---|
| DE | 102010053836 | | 8/2011 | |
| DE | 102012008530 | | 11/2013 | |
| EP | 0568518 | | 11/1993 | |
| EP | 2689976 | | 1/2014 | |
| JP | H0742445 | | 8/1995 | |
| JP | 2007308008 | | 11/2007 | |
| JP | 2009161967 | | 7/2009 | |
| JP | 2013028903 | | 2/2013 | |
| KR | 20110022950 | | 3/2011 | |
| WO | 2012034768 | | 3/2012 | |
| WO | WO 2013034252 | A1 * | 3/2013 | ........... G01S 13/931 |
| WO | WO 2013164090 | A1 * | 11/2013 | ......... B60R 25/2054 |
| WO | 2016087435 | | 6/2016 | |

OTHER PUBLICATIONS machine translation DE102010053836A1.*
"German Search Report," for Priority Application No. DE102014117896.3 dated May 26, 2015 (8 pages).
"International Search Report and Written Opinion," for Corresponding PCT Application No. PCT/EP2015/078191 dated Feb. 19, 2016 (12 pages).
Office Action for Chinese Patent Application No. 201580065812.7 dated Jul. 5, 2018 (12 pages).
Office Action for Korean Patent Application No. 10-2017-7018423 dated Apr. 30, 2019 (5 pages) English Translation Only.

* cited by examiner

METHOD FOR CONTROLLING A SLIDING DOOR ARRANGEMENT OF A MOTOR VEHICLE

CROSS-REFERENCE TO RELATED APPLICATIONS

This application is a national stage application under 35 U.S.C. 371 of International Patent Application Serial No. PCT/EP2015/078191, entitled "Method for Actuating a Sliding Door Arrangement of a Motor Vehicle," filed Dec. 1, 2015, which claims priority from German Patent Application No. DE 10 2014 117 896.3, filed Dec. 4, 2014, the disclosure of which is incorporated herein by reference.

FIELD OF THE TECHNOLOGY

The disclosure relates to methods for controlling a sliding door arrangement of a motor vehicle, a control arrangement for carrying out such methods, and a sliding door arrangement for carrying out such methods.

BACKGROUND

Current motor vehicles are widely fitted with the convenience function of the motorized displacement of closure elements, in particular of doors and flaps. In this case, the problem-free, user-controlled triggering of an opening process or of a closing process is of particular importance. Besides triggering by radio remote control, it is known to trigger an opening movement or closing movement by an operator gesture.

With the known method for controlling a motorized sliding door arrangement (DE 10 2012 008 530 A1), on which the disclosure is based, it is provided that during operator event monitoring by means of a control arrangement the sensor signals of a capacitive sensor arrangement are monitored as to whether a predetermined foot movement of the operator has been detected. In the event of the detection of such an operator event, an opening process or a closing process is initiated accordingly. This type of triggering gives the operator a high level of user convenience, primarily if the operator has no hand free to operate a radio remote control owing to carrying luggage or similar.

When controlling a sliding door arrangement, the known method represents a challenge regarding robustness against triggering in error. The reason for this is that the foot movement that is defined as the operator event, for example a kicking motion towards the sliding door, can occur accidentally in a similar form in the sliding door opening when entering the motor vehicle. The result would be an unwanted triggering of a closing movement while the operator is entering.

SUMMARY

The disclosure is based on the problem of implementing and developing the known method so that the robustness against triggering in error is increased at low cost.

The above problem is overcome with a method as described herein.

It is essentially the basic consideration to carry out the operator event monitoring by means of, e.g., using or with, a sensor arrangement disposed in or on the sliding door, so that the operator that is in front of the sliding door opening is for the most part outside the detection region of the sensor arrangement after completion of the opening process. It is thereby excluded that the operator triggers an unwanted closing process when entering the motor vehicle through the sliding door opening.

In detail, it is proposed that the sensor arrangement is disposed at least partly in or on the sliding door and that depending on the result of the operator event monitoring, opening of the closure element at least from a closed end position and/or closing of the closure element at least from an opened end position is carried out by means of the drive arrangement.

In an embodiment, the operator event is a foot movement of the operator, which in practice has proved to be particularly advantageous. Such a foot movement can be detected in a particularly simple manner with a capacitive sensor arrangement that is yet to be described.

The proposed positioning of the sensor arrangement in or on the sliding door results in the unwanted effect that the at least one sensor element produces different idle signals depending on the sliding door position in addition to the useful signals resulting from an operator event. Furthermore, the idle signals relate to the interaction of the at least one sensor element with the motor vehicle. Because the interaction changes with the displacement of the sliding door, there is a resulting profile of the idle signals. On the one hand, the idle signals can be used to determine the position of the sliding door. On the other hand, the idle signals adversely affect the operator event monitoring if no compensation measures are taken to "filter out" the idle signals during the operator event monitoring. Accordingly, in an embodiment the profile of the respective idle signal is detected and stored in a setup mode by means of a reference movement.

Various embodiments relate to advantageous versions for a modification of the operator event monitoring, in particular to allow the disruptive effect of the idle signals to occur in the background or to filter them out as mentioned above.

In various embodiments, the operator event monitoring is based on exceeding and/or falling below the at least one switching threshold, which can be implemented particularly simply in control technology terms. In order to substantially filter out the idle signals during operator event monitoring, it is provided that the level of the switching threshold is modified as a function of the sliding door position, and so that the idle signals as such cannot reach the switching threshold and as a result cannot cause false detection of operator events.

According to various embodiments, with the proposed method a capacitive, oblong sensor arrangement is used, which results in a particularly inexpensive and at the same time robust design in relation to the rough ambient conditions in the case of motor vehicles. Some embodiments relate to structuring of the oblong sensor arrangement with a number of longitudinal segments, which enables for example determination of the sliding door position and/or the direction of motion of the sliding door, without which additional sensors are necessary.

According to a further embodiment, a control arrangement for carrying out the proposed method is disclosed. Reference may be made to all statements related thereto.

According to a further embodiment, a sliding door for carrying out the proposed method is disclosed, wherein an aforementioned sensor arrangement is at least partly disposed in or on the sliding door. Also in respect of the embodiment, reference can be made to the relevant implementations described herein.

According to a further embodiment, a sliding door arrangement for carrying out the above method is disclosed as such. It is essential according to the further embodiment that the sensor arrangement is at least partly disposed in or on the sliding door. Furthermore, reference can be made to the descriptions of the proposed method.

An embodiment provides a method for controlling a sliding door arrangement of a motor vehicle, wherein the sliding door arrangement comprises a sliding door, a drive arrangement for motorized displacement of the sliding door, a control arrangement and a sensor arrangement with at least one sensor element in particular implemented as a proximity sensor, wherein during operator event monitoring the sensor signals of the sensor arrangement are monitored by means of the control arrangement as to whether a predetermined operator event exists, wherein the sensor arrangement is at least partly disposed in or on the sliding door and wherein depending on the result of the operator event monitoring, opening the sliding door is carried out by means of the drive arrangement at least from a closed end position and/or closing the sliding door is carried out by means of the drive arrangement at least from an open end position.

In various embodiments, at least one operator event is defined as an operator gesture that comprises a predetermined movement profile of at least one limb of the operator, such that the predetermined movement profile comprises at least two essentially opposite operator movement stages.

In various embodiments, at least one operator event is defined as a foot movement of the operator, such that at least one operator event is defined as a reciprocal movement of the foot of the operator, such that the reciprocal movement is defined as a kicking motion transverse to the flat side of the sliding door or as a wiping movement along the flat side of the sliding door.

In various embodiments, the at least one sensor element, in addition to the useful signals related to an operator event, produces different idle signals depending on the sliding door position that are related to the sensor detection of the motor vehicle itself, in particular of the part of the motor vehicle enclosing the sliding door, such that in a setup mode a reference displacement of the sliding door between the open end position and the closed end position is carried out without an operator event, while the profile of the sensor signal is detected and stored by means of the control arrangement.

In various embodiments, the sliding door position is detected by means of the control arrangement and the operator event monitoring is modified depending on the sliding door position, such that the operator event monitoring is modified depending on the sliding door position exclusively in predetermined sliding door positions, optionally wherein the operator event monitoring is carried out depending on the sliding door position exclusively in the closed end position or exclusively in the open end position or exclusively in both end positions.

In various embodiments, the operator event monitoring is modified by means of the control arrangement depending on the sliding door position such that detection of the predetermined operator event is possible regardless of the idle signal.

In various embodiments, in the operator event monitoring the control arrangement monitors whether the sensor signals correspond to the signal characteristic values of the operator event model as a necessary condition for the detection of the operator event, wherein the operator event model is modified depending on the sliding door position.

In various embodiments, in the operator event monitoring the control arrangement monitors for exceeding and/or falling below at least one switching threshold for the detection of the operator events.

In various embodiments, during the operator event the at least one sensor element produces a pulse-like time profile of the sensor signals—sensor pulse, such that a necessary condition for the detection of the operator event is defined as reaching the switching threshold at least twice within a predetermined measurement time window.

In various embodiments, the level of the at least one switching threshold is modified depending on the sliding door position, so that a switching threshold profile against the sliding door position results, such that the switching threshold is modified during a closing movement and/or an opening movement of the sliding door such that the idle signals as such do not reach the switching threshold, at least after the modification.

In various embodiments, the switching threshold is modified starting with the first time the switching threshold is exceeded after the measurement time window has elapsed, if no operator event has been detected within the measurement time window.

In various embodiments, for the modification of the switching threshold a modification table is stored in the control arrangement that assigns predetermined modification parameters to a number of sliding door positions or sliding door position intervals, and wherein the switching threshold is modified depending on the modification parameter corresponding to the respective position of the sliding door, such that the switching threshold is reduced or increased by the modification parameter corresponding to the respective position of the sliding door.

In various embodiments, during the operator event monitoring the determination of the sensor signals is carried out by means of the control arrangement based on a signal processing method, wherein the signal processing method is defined by a signal processing parameter set comprising signal processing parameters such as minimum signal level, temporal measurement resolution or amplitude measurement resolution and wherein the signal processing parameter set is modified depending on the sliding door position.

In various embodiments, a position sensor is associated with the sliding door and the sliding door position is determined by means of the control arrangement using the position sensor, or at least one end switch is associated with the sliding door and the sliding door position is determined by means of the control arrangement using the end switch.

In various embodiments, the sensor arrangement is implemented as a capacitive, oblong sensor arrangement and the at least one sensor element is an oblong measuring electrode extending along the flat side of the sliding door that comprises at least one, such as exactly one, electrical conductor, such that the sensor arrangement comprises two oblong sensor elements that extend parallel to each other at least in segments.

In various embodiments, the oblong sensor arrangement is structured with a number of longitudinal segments and at least two adjacent longitudinal segments comprise different sensor characteristics, in particular different sensitivities.

In various embodiments, the structuring of the sensor arrangement with a number of longitudinal segments causes a stationary object disposed in front of the sliding door, in particular a stationary operator, to produce a signal profile in the sensor signals during a motorized closing movement and/or during a motorized opening movement, and the sliding door position and/or the direction of motion of the sliding door is/are determined from the signal profile by means of the control arrangement.

Various embodiments provide for a control arrangement for carrying out the method disclosed herein.

Various embodiments provide a sliding door for carrying out a method disclosed herein with a sensor arrangement that is disposed at least partly in or on the sliding door.

In various embodiments, the sensor arrangement is implemented as a capacitive, oblong sensor arrangement and the at least one sensor element is an oblong measuring electrode extending along the flat side of the sliding door that comprises at least one, such as exactly one, electrical conductor, such that the sensor arrangement extends along the flat side of the sliding door, such that the sensor arrangement extends over at least part of the horizontal width of the sliding door.

In various embodiments, a sliding door arrangement for carrying out methods described herein has a sliding door, a drive arrangement for motorized displacement of the sliding door, a control arrangement and a sensor arrangement with at least one sensor element, in particular implemented as a proximity sensor. During operator event monitoring by means of the control arrangement the sensor signals of the sensor arrangement are monitored as to whether a predetermined operator event exists, and the sensor arrangement is disposed at least partly in or on the sliding door.

BRIEF DESCRIPTION OF THE DRAWINGS

The disclosure is described below using figures that only represent an exemplary embodiment. In the figures.

DETAILED DESCRIPTION

Figure 1:
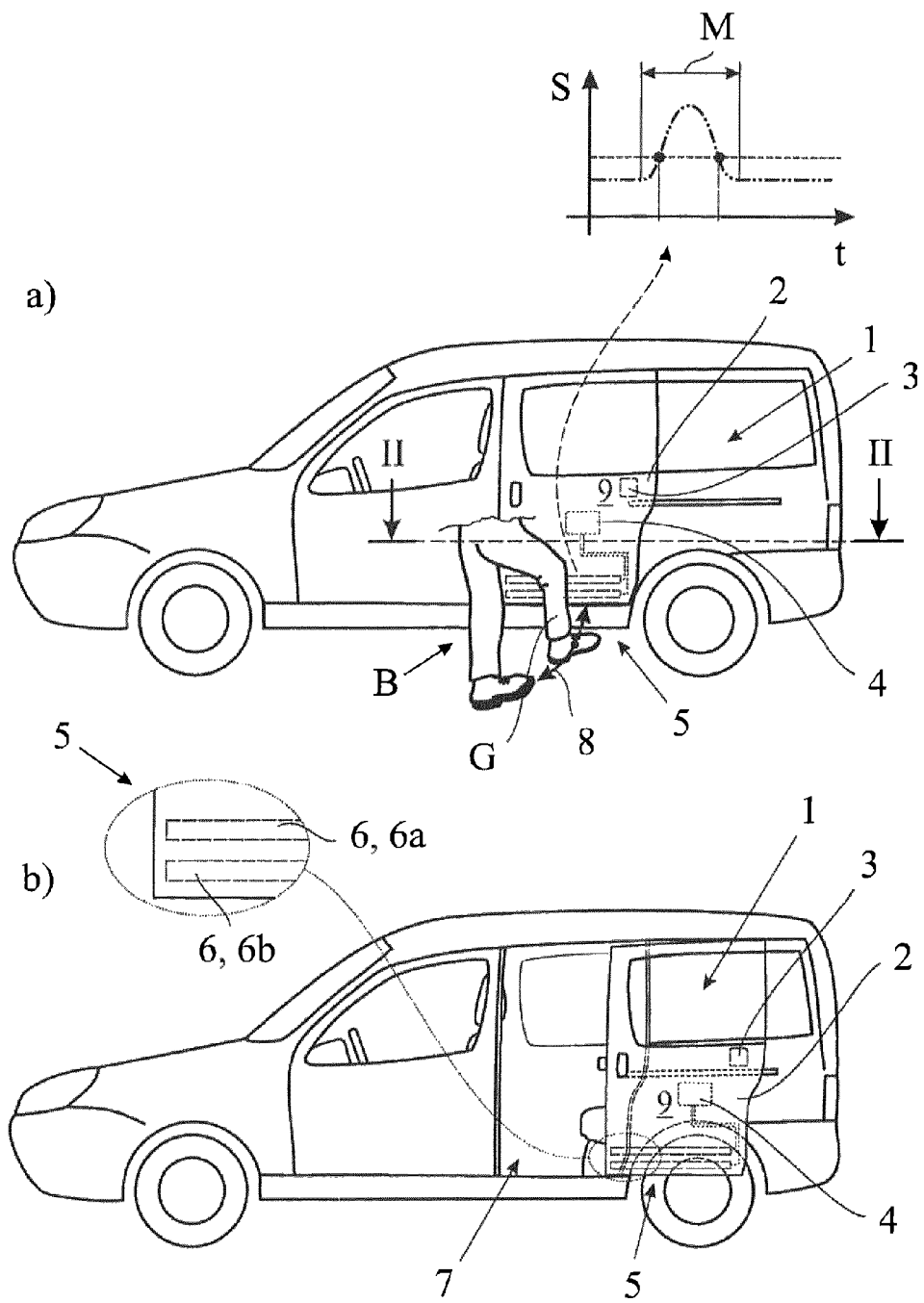
FIG. 1 shows a motor vehicle with a proposed sliding door and a proposed control arrangement for carrying out the proposed method a) with the sliding door in the closed end position and b) with the sliding door in the open end position, FIGS. 2 a), b), c) show the process of a closing movement of the sliding door according to FIG. 1 in a schematic sectional view along the section line II-II

The proposed method is described below using a sliding door arrangement 1 of a motor vehicle. In the case of the exemplary embodiment represented in FIG. 1, the sliding door arrangement 1 is fitted with a sliding door 2 that can be displaced by a motor in an essentially horizontal displacement direction. In principle, it is also conceivable that a displacement is carried out in other displacement directions, in particular in a vertical displacement direction.

The sliding door arrangement 1 is further fitted with a drive arrangement 3 for motorized displacement of the sliding door 2 between a closed end position and an open end position. The closed end position can be the fully closed position of the sliding door, whereas the open end position can be the fully open position of the sliding door.

For controlling the drive arrangement 3, a control arrangement 4 is provided that is coupled to a sensor arrangement 5 for control technology purposes.

The sensor arrangement 5 comprises at least one sensor element 6 that is implemented in this case as a proximity sensor. In the case of the represented exemplary embodiment, the sensor arrangement 5 is fitted with two sensor elements 6a, 6b that are disposed adjacent to each other in a manner that is yet to be described. With a suitable design, the fitting of the sensor arrangement 5 with two sensor elements 6a, 6b enables high detection reliability. Only the sensor signals of sensor element 6a are discussed below for the purposes of a clear representation. The same applies respectively to the other sensor element 6b. Furthermore, it should be pointed out that more than two sensor elements 6 can also be provided.

During operator event monitoring, it is now provided according to the proposal that the sensor signals of the sensor arrangement 5 are monitored by means of, that is to say, by, with, or using, the control arrangement 4 as to whether a predetermined operator event exists. Examples of such an operator event are given below.

FIG. 1 shows that the sensor arrangement 5 is disposed fully in the sliding door 2. In this case, the sensor arrangement 5 can be disposed behind a covering of non-conducting material, in particular of a plastic. In principle, the covering can be the outer door skin of the sliding door 2. However, it can also be provided that the sensor arrangement 5 is disposed at least partly on the sliding door 2, in particular on the sliding door 2.

The sequence in FIGS. 2a, 2b and 2c shows a closing movement of the sliding door 2 in the door closing stages a, b and c. The yet to be described sensor signals S produced in the three door closing stages a, b and c by the at least one sensor element 6 are shown in FIGS. 3a, 3b and 3c. Regarding these representations, reference can be made to the fact that the door closing stage a comprises a door displacement stage in the sliding direction of the sliding door 2 that is indicated in FIG. 2a with an arrow. In this case, the door closing stage also comprises an initial static stage, in which the sliding door 2 has not yet moved. The door closing stage b, by contrast, comprises a door displacement stage that is essentially oriented transversely to the sliding direction and that is also indicated in FIG. 2b with an arrow. The door closing stage c, by contrast, is essentially designed as a purely static stage, in which the sliding door 2 is essentially not moved further, but in which for example a fixing of the sliding door 2 is carried out by means of a motor vehicle lock that is not shown, in particular by pulling the sliding door 2 shut by means of a closing drive.

It is essential for the proposed method that opening the sliding door 2 at least from a closed end position and/or closing the sliding door 2 at least from an open end position is carried out by means of the drive arrangement 3 depending on the result of the operator event monitoring. It is of interest here that that owing to the arrangement of the sensor arrangement 5 in or on the sliding door 2, the detection region of the sensor arrangement 5 is also displaced with the displacement of the sliding door 2. In this case, it is so that an object, in particular an operator B, that is located within the detection region of the sensor arrangement 5 with the sliding door 2 closed, is outside of the detection region following a displacement of the sliding door 2 into the open end position. This ensures that an operator B in front of the sliding door opening 7 in the open end position is outside of the detection region, so that false detection of an operator event that could be related to an entry movement of the operator B is excluded. The detection range of the sensor arrangement 5 to a first approximation has been provided with the reference character E in FIG. 2a.

The terms "at least from a closed end position" and "at least from an open end position" mean that a motorized displacement of the sliding door 2 can at least be triggered by the operator event monitoring if the sliding door 2 is in the closed end position or in the open end position. Additionally, it can also be provided that a motorized displacement of the sliding door 2 can be triggered by the operator event monitoring with the sliding door 2 in intermediate positions, i.e. between the closed end position and the open end position. Alternatively or additionally, it can further be provided that a motorized displacement of the sliding door 2 can still be triggered by the operator event monitoring during an already occurring motorized displacement of the sliding door 2. For example, a reversal of the motion of the sliding door 2 can be triggered by means of the operator event monitoring.

An aforementioned operator event can be defined as an operator gesture that comprises a predetermined movement profile of at least one limb G of the operator B. The predetermined movement profile can comprise at least two essentially opposed operator movement stages. In the case indicated in FIG. 1*a*, the operator event is defined as a foot movement of the operator B. In this case, the operator event is defined in an embodiment as a reciprocal movement of the foot of the operator B. The above reciprocal movement is, in this case, a kicking motion 8 that is defined transversely to the flat side 9 of the sliding door 2. Alternatively, the reciprocal movement can be defined as a wiping motion along the flat side 9 of the sliding door 2.

Figure 2:
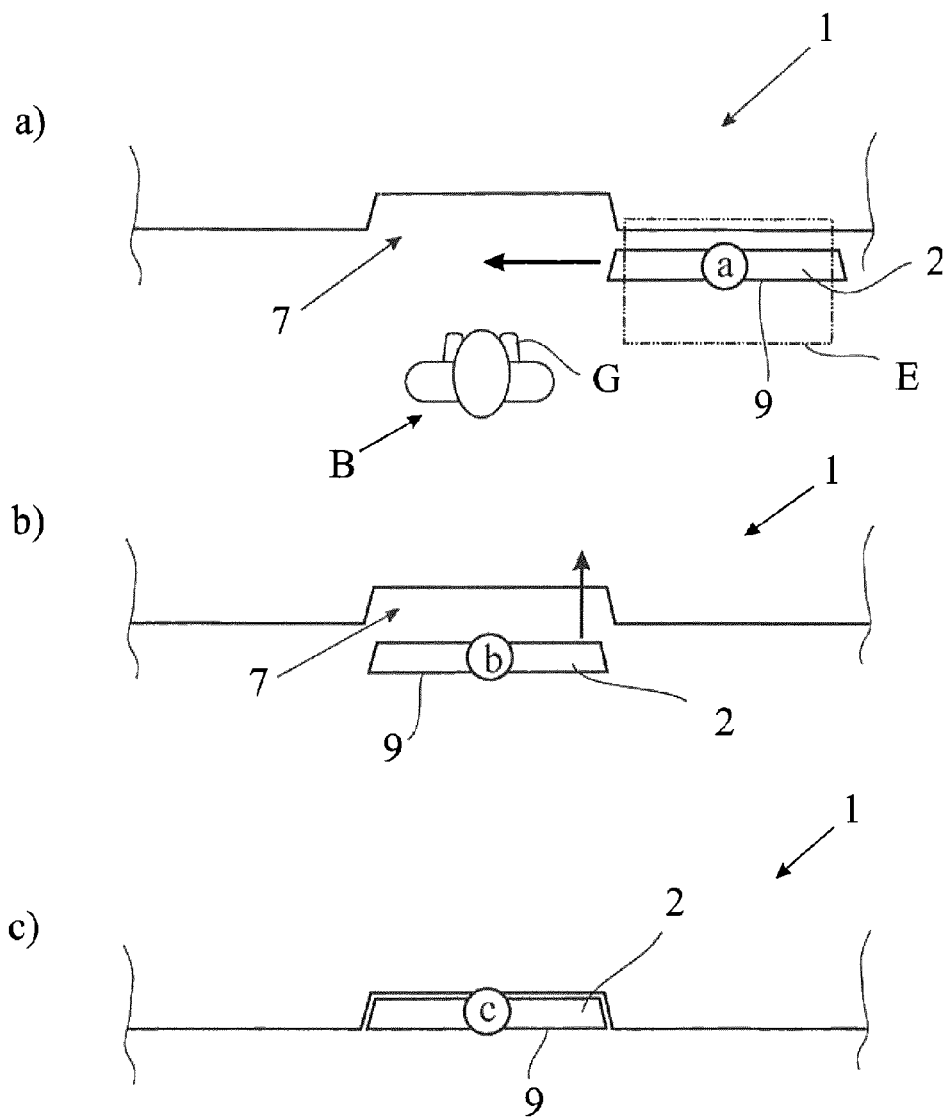

In three representations, FIG. 2 shows the closing of the sliding door 2 from the open end position (FIG. 2*a*) via an intermediate position (FIG. 2*b*) into the closed end position (FIG. 2*c*). With a view to the detection range E of the sensor arrangement 5 that is only indicated in FIG. 2*a*, it arises from this representation that the at least one sensor element 6 produces, in addition to the useful signals $S_n$ resulting from an operator event, different idle signals $S_0$ depending on the sliding door position that are the result of the sensor detection of the motor vehicle itself, in particular of the part of the motor vehicle enclosing the sliding door 2.

FIG. 3*a* shows the profile of the idle signals $S_0$ during the closing of the sliding door 2 shown in FIG. 2 without an operator in the detection region G of the sensor arrangement 5.

By contrast, FIG. 3*b* shows the situation in which the operator B carries out a foot movement that is represented in FIG. 1*a*. Here the useful signal $S_n$, which relates to the operator event, overlays the idle signal $S_0$. From an overview of FIGS. 3*a* and 3*b* it is clear that the idle signal $S_0$ constitutes a disruptive factor for the operator event monitoring, the disruptive characteristic of which, in this case the level thereof, depends on the sliding door position.

In principle, it is conceivable that in a setup mode a reference movement of the sliding door 2 is carried out between the open position and the closed end position without an operator event, while the profile of the idle signal $S_0$ is detected and stored by means of the control arrangement 4. The storage of the profile of the idle signal $S_0$ can be incorporated into the operator event monitoring in a way that is yet to be described.

Generally, in an embodiment it is proposed that the sliding door position is detected by means of (e.g., by, with, or using) the control arrangement 4 and the operator event monitoring is modified depending on the sliding door position. The modification can, as indicated above, be based on the stored profile of the idle signal $S_0$. For example, the idle signal $S_0$ corresponding to the respective sliding door position can be subtracted from the overall signal S produced by the sensor element 6, so that as a result the useful signal $S_n$ that is relevant to the operator event monitoring results. In this case, it is assumed that the idle signal $S_0$ and the useful signal $S_n$ add up to the total signal S produced by the sensor element 6.

The above modification of the operator event monitoring depending on the sliding door position can be provided exclusively in predetermined sliding door positions, in particular in the closed end position, the open end position or in the two end positions. This enables the cost of the modification of the operator event monitoring to be reduced. In the case of the version that is yet to be described, which is indicated in FIG. 3*b*, a modification of the operator event monitoring is carried out exclusively in the closed end position.

Generally, it can be that the operator event monitoring is modified by means of the control arrangement 4 depending on the sliding door position such that detection of the predetermined operator event is possible regardless of the idle signals $S_0$. Advantageous versions are described further below.

In principle, it can be provided that the operator event monitoring is carried out depending on the sliding door position exclusively from the closed end position or exclusively from the open end position or exclusively from both end positions. Otherwise, the operator event monitoring is suitably deactivated. Alternatively or additionally, it can be provided that the operator event monitoring is always deactivated during the motorized displacement of the sliding door 2.

In principle, various possibilities for the implementation of the operator event monitoring are conceivable. In this case, during the operator event monitoring the control arrangement 4 monitors whether the sensor signals S produced by the at least one sensor element 6 correspond to the signal characteristic values of the operator event model as a necessary condition for the detection of operator events, wherein the operator event model is modified depending on the sliding door position, in particular with respect to the idle signal $S_0$.

Figure 3:
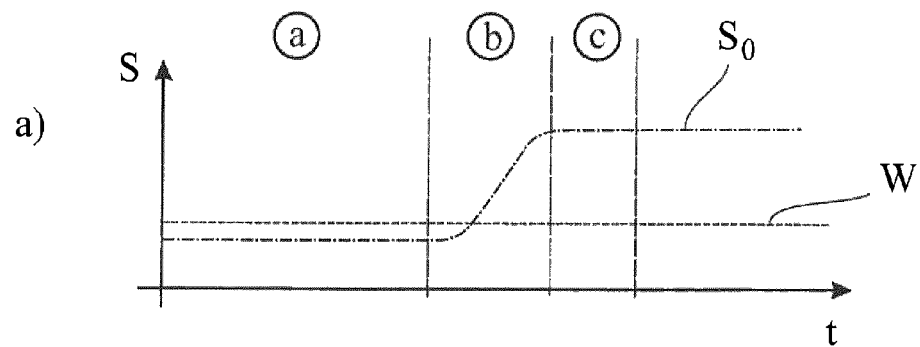
FIG. 3 shows the sensor signals of the sensor arrangement over the closing movement according to FIG. 2 a) without an operator event, b) with an operator event for a first version for the modification of the switching threshold and c) with an operator event for a second version for the modification of the switching threshold.
Figure 3:
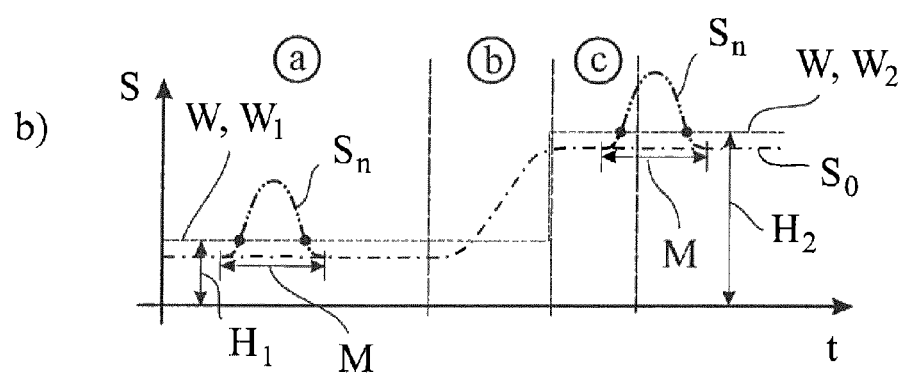
Figure 3:
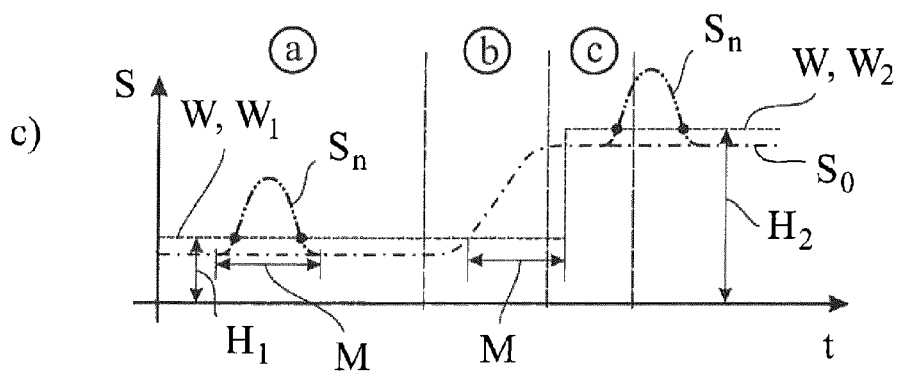

In detail, as mentioned above, it can be that the control arrangement 4 monitors for exceeding a switching threshold during the operator event monitoring for the detection of operator events. Alternatively or additionally, falling below at least one switching threshold can be monitored. In FIG. 3, the switching threshold is represented as a dashed line in each case and is provided with the reference character W. Exceeding or falling below at least one switching threshold W can be implemented particularly easily in control technology terms. This is in particular applicable if during the operator event the at least one sensor element 6 produces a pulse-like time profile of the sensor signal, i.e. a sensor pulse. This is shown by way of example in the diagram shown in FIG. 1*a*. A necessary condition for the detection of the operator event is reaching the switching threshold W at least twice within a predetermined measurement time window M. In the case of the situation shown in FIG. 1*a*, it is assumed that the operator event of the foot movement that is mentioned above is associated with exceeding the switching threshold W and then falling below the switching threshold W within the measurement time window M.

Additionally to the aforementioned necessary condition for the detection of the operator event, other necessary conditions can be defined. For example, necessary conditions of exceeding and/or falling below a width and/or a level and/or an edge gradient and/or a curvature of parts of the sensor pulse can be defined. Furthermore, it is conceivable that a necessary condition of exceeding and/or falling below a time offset of two sensor pulses is defined, wherein the sensor pulse is associated with a sensor element 6a, 6b in each case. Other necessary conditions for the detection of the operator event are conceivable.

In an embodiment, it is provided that the level of the at least one switching threshold W is modified depending on the sliding door position, so that a switching threshold profile against the sliding door position results. This is shown by way of example in FIG. 3b. The modification of the level of the at least one switching threshold W has the effect that a switching threshold $W_1$ with a level $H_1$ is defined before reaching the closed end position and a switching threshold $W_2$ with a level $H_2$ is defined after reaching the closed end position. In this case, the switching threshold W is modified during a closing movement and/or an opening movement of the sliding door 2 such that the idle signals $S_0$ as such do not reach the switching threshold, at least after the modification of the switching threshold W, in this case lying below the switching threshold W. In FIG. 3b it can accordingly be seen that in the door closing stage a, the idle signal $S_0$ lies below the switching threshold $W_1$ and that the idle signal $S_0$ also lies below the switching threshold $W_2$ in the door closing stage c.

FIG. 3c shows another version for the modification of the switching threshold W. Here it is provided that the switching threshold W is modified starting with the first time the switching threshold $W_1$ is exceeded after the measurement time window M has elapsed, if no operator event has been detected within the measurement time window M. In the case of the situation shown in FIG. 3c, in the door movement stage b the first time the switching threshold $W_1$ is exceeded is related to the idle signal $S_0$, and not to a useful signal $S_n$. Accordingly, here it is not a signal pulse shown in FIG. 1a that is associated with an operator event, but the idle signal $S_0$ as mentioned above. As a result of no operator event having been detected after expiry of the measurement time window M, as proposed above the level of the switching threshold $W_2$ is defined at $H_2$, so that the switching threshold-based detection of the operator event can be carried out regardless of the idle signal $S_0$.

The two aforementioned versions for the modification of the switching threshold W can be implemented in a particularly simple manner in control technology terms, wherein the simple implementability can sometimes be at the expense of detection reliability during a sliding door movement 2. Particularly high detection reliability can, however, be achieved by storing a modification table for the modification of the switching threshold W in the control arrangement 4, the table assigning predetermined modification parameters to a number of sliding door positions or sliding door position intervals, wherein the switching threshold W is modified depending on a modification parameter corresponding to the respective position of the sliding door 2. In an embodiment, the switching threshold W is reduced or increased by the modification parameter corresponding to the respective position of the sliding door 2.

The modification of the operator event monitoring can in principle also comprise other parameters. During the operator event monitoring, the determination of the sensor signals by means of the control arrangement 4 is carried out based on a signal processing method, wherein the signal processing method is defined by a signal processing parameter set with signal processing parameters such as minimum signal level, temporal measurement resolution or amplitude measurement resolution. Against this background, it can be provided that the signal processing parameter set is modified depending on the sliding door position. Further signal processing parameters can be related to the use of high-pass filters, low-pass filters, amplifiers or similar.

If the position of the sliding door 2 has to be determined for the above modification of the operator event monitoring, in a version a position sensor for the sliding door 2 can be used for this. Alternatively, at least one end switch can be associated with the sliding door 2, wherein the sliding door position is determined by means of the control arrangement 4 using the end switch. In this case, the end switch is provided by means of a switch mechanism that is disposed in a motor vehicle lock that is associated with the sliding door 2 and that is not shown here. Such a switch mechanism is also referred to as an ajar switch mechanism.

Numerous advantageous versions of the embodiment of the sensor arrangement 5 that is used for the proposed method are conceivable. In this case, the sensor arrangement 5 is implemented as a capacitive, oblong sensor arrangement, wherein the at least one sensor element 6 is an oblong measuring electrode extending along the flat side 9 of the sliding door 2, which comprises at least one, in this case exactly one, electrical conductor. In the case of the represented embodiment, the sensor arrangement 5 comprises two oblong sensor elements 6 that extend parallel to each other at least in segments, and in some embodiments horizontally.

The sensor arrangement 5 is disposed in the lower region of the sliding door 2, as illustrated in FIG. 1. This takes into account the fact that the sensor arrangement 5 is used here for the detection of an operator event that is defined as a foot movement.

In principle, the oblong sensor arrangement 5 can be arranged to be homogenous along the longitudinal extent thereof, and accordingly to comprise a uniform sensor characteristic. It can, however, also be advantageous that the oblong sensor arrangement 5 is structured with a number of longitudinal segments that are not shown here. In this case, it can be provided that at least two adjacent longitudinal segments comprise different sensor characteristics, in particular different sensitivities.

Depending on the structuring of the sensor arrangement 5, longitudinal positions, longitudinal displacements and/or longitudinal displacement directions of the operator B or a limb of the operator B can be detected by sensor along the longitudinal extent of the sensor arrangement 5.

In the case of the represented exemplary embodiment, the sensor arrangement 5 comprises as indicated above at least two, such as exactly two, oblong sensor elements 6a, 6b that can form capacitive measuring electrodes. In an embodiment, a measuring electrode is arranged homogeneously along the longitudinal extent of the sensor arrangement 5. This or a further measuring electrode can however also be structured along the longitudinal extent of the sensor arrangement 5. In a version, the structuring can be a segmental change of sensitivity of the measuring electrode. Alternatively or additionally, it can be provided that the structuring is a division of the measuring electrode into at least two sub measuring electrodes that can be controlled and/or read out separately. This enables the detection of the above information for a longitudinal movement in a particularly simple manner.

The detection of the above information for a longitudinal movement can be used in a different manner.

For example, it can be provided that the structuring of the sensor arrangement 5 as a number of longitudinal segments causes a stationary object disposed in front of the sliding door 2, in particular a stationary operator B, to produce a signal profile in the sensor signal during a motorized closing movement and/or during a motorized opening movement, wherein the sliding door position and/or the direction of motion of the sliding door 2 is/are determined by means of the control arrangement 4 from the signal profile. The sliding door position or the direction of motion can be determined thereby without requiring additional sensors, in particular the aforementioned position sensor.

The above information for a longitudinal movement can be a component of predetermined operator events. In a first version, two operator events can differ by a longitudinal direction of motion of the operator B, so that the control of the drive arrangement 3 is carried out depending on the detected longitudinal direction of motion. For example, a wiping movement with an at least initial movement in the opening direction of the sliding door 2 triggers motorized opening of the sliding door 2 and a wiping movement with an at least initial movement in the closing direction of the sliding door 2 triggers motorized closing of the sliding door 2. The result is a particularly intuitive operating methodology.

In order to prevent unwanted triggering of motorized closing of the sliding door 2, it can be provided that only a wiping movement with an at least initial movement in the opening direction of the sliding door 2 triggers the motorized opening of the sliding door 2 and that a wiping movement with an at least initial movement in the closing direction is always ignored.

According to a further embodiment with an independent significance, the control arrangement 4 for carrying out the proposed method is disclosed as such. Reference can be made to all statements regarding the proposed method that are suitable for describing the control arrangement 4.

According to a further embodiment, a sliding door 2 for carrying out the proposed method is disclosed, wherein a sensor arrangement 5 that is mentioned above is provided, which is at least partly disposed in or on the sliding door 2. In addition, in this respect reference can be made to the statements regarding the proposed method.

The sensor arrangement 5 can be, as mentioned above, implemented as a capacitive, oblong sensor arrangement 5, wherein the at least one sensor element 6 is an oblong measuring electrode extending along the flat side 9 of the sliding door 2, which comprises at least one, in this case exactly one, electrical conductor. In an embodiment, the sensor arrangement 5 extends along the flat side 9 of the sliding door 2. In this case, the sensor arrangement 5 extends over at least a part of the horizontal width of the sliding door 2, such as over a significant part of the horizontal width of the sliding door 2, so that in total a larger detection range E of the sensor arrangement 5 results.

According to a further embodiment, which also has independent significance, the sliding door arrangement 1 is disclosed. Additionally, in this respect reference can be made to the statements regarding the proposed method.

The invention claimed is:

1. A method for controlling a sliding door arrangement of a motor vehicle, wherein the sliding door arrangement comprises a sliding door, a drive arrangement for motorized displacement of the sliding door, a control arrangement and a sensor arrangement comprising at least one sensor element comprising a detection range, wherein during operator event monitoring the sensor signals of the sensor element are monitored by the control arrangement as to whether a predetermined operator event exists, wherein the sensor element is disposed in or on the sliding door, and wherein depending on the result of the operator event monitoring, opening the sliding door is carried out by the drive arrangement at least from a closed end position and closing the sliding door is carried out by the drive arrangement at least from an open end position, wherein the detection range of the sensor element is located in a first area when the sliding door is in the open end position and a second area when the sliding door is in a closed end position, such that an operator event performed in the first area is not within the detection range of the sensor element when the sliding door is in the closed end position, and an operator event performed in the second area is not within the detection range of the sensor element when the sliding door is in the open end position.

2. The method according to claim 1, wherein at least one operator event is defined as an operator gesture that comprises a predetermined movement profile of at least one limb of the operator.

3. The method according to claim 2, wherein the at least one operator event is defined as a foot movement of the operator.

4. The method according to claim 1, wherein the at least one sensor element, in addition to one or more useful signals related to an operator event, produces different idle signals depending on the sliding door position that are related to the sensor detection of the motor vehicle itself.

5. The method according to claim 4, wherein the sliding door position is detected by the control arrangement and the operator event monitoring is modified depending on the sliding door position.

6. The method according to claim 5, wherein the operator event monitoring is modified by the control arrangement depending on the sliding door position such that detection of the predetermined operator event is possible regardless of the different idle signals.

7. The method according to claim 1, wherein in the operator event monitoring the control arrangement monitors whether the sensor signals correspond to the signal characteristic values of the operator event model as a necessary condition for the detection of the operator event, wherein the operator event model is modified depending on the sliding door position.

8. The method according to claim 1, wherein in the operator event monitoring the control arrangement monitors for exceeding and/or falling below at least one switching threshold for the detection of the operator events.

9. The method according to claim 1, wherein during the operator event the at least one sensor element produces a pulse-like time profile of the sensor signals.

10. The method according to claim 8, wherein the level of the at least one switching threshold is modified depending on the sliding door position, so that a switching threshold profile against the sliding door position results.

11. The method according to claim 9, wherein the switching threshold is modified starting with the first time the switching threshold is exceeded after the measurement time window has elapsed, if no operator event has been detected within the measurement time window.

12. The method according to claim 10, wherein for the modification of the switching threshold a modification table is stored in the control arrangement that assigns predetermined modification parameters to a number of sliding door positions or sliding door position intervals, and that the switching threshold is modified depending on the modification parameter corresponding to the respective position of the sliding door.

13. The method according to claim 1, wherein during the operator event monitoring the determination of the sensor signals is carried out by the control arrangement based on a signal processing method, wherein the signal processing method is defined by a signal processing parameter set comprising signal processing parameters, and wherein the signal processing parameter set is modified depending on the sliding door position.

14. The method according to claim 1, wherein a position sensor or at least one end switch is associated with the sliding door and wherein the sliding door position is determined by the control arrangement using the position sensor or using the at least one end switch.

15. The method according to claim 1, wherein the sensor arrangement is implemented as a capacitive, oblong sensor arrangement and wherein the at least one sensor element is an oblong measuring electrode extending along the flat side of the sliding door that comprises at least one electrical conductor.

16. The method according to claim 15, wherein the oblong sensor arrangement is structured with a number of longitudinal segments and that at least two adjacent longitudinal segments comprise different sensor characteristics.

17. The method according to claim 1, wherein the structuring of the sensor arrangement with a number of longitudinal segments causes a stationary object disposed in front of the sliding door to produce a signal profile in the sensor signals during a motorized closing movement and/or during a motorized opening movement, and wherein the sliding door position and/or the direction of motion of the sliding door is/are determined from the signal profile by the control arrangement.

18. A control arrangement for carrying out the method according to claim 1.

19. A sliding door for carrying out a method according to claim 1, comprising a sensor element that is disposed in or on the sliding door.

20. A sliding door according to claim 19, wherein the sensor arrangement is implemented as a capacitive, oblong sensor arrangement and wherein the at least one sensor element is an oblong measuring electrode extending along the flat side of the sliding door that comprises at least one electrical conductor.

21. A sliding door arrangement for carrying out the method according to claim 1, the sliding door arrangement comprising a sliding door, a drive arrangement for motorized displacement of the sliding door, a control arrangement, and a sensor arrangement with at least one sensor element, wherein during operator event monitoring by the control arrangement the sensor signals of the sensor element are monitored as to whether a predetermined operator event exists, and wherein the sensor element is disposed in or on the sliding door.

22. The method according to claim 1, wherein depending on the result of the operator event monitoring, opening the sliding door is carried out by the drive arrangement at least from a closed end position.

* * * * *